United States Patent Office 3,416,873
Patented Dec. 17, 1968

3,416,873
POLYESTER DYEING WITH 1-(2-METHOXY-4-NI-TROBENZENEAZO) - 2 - HYDROXY-11H-BENZO(a)CARBAZOLE-3-CARBOX-p-ANISIDIDE
Andrew Fono, Montclair, and Mohammad Nasimuddin Siddiqui, South Orange, N.J., assignors to Otto B. May Inc., Newark, N.J., a corporation of New Jersey
No Drawing. Filed Oct. 11, 1967, Ser. No. 674,660
9 Claims. (Cl. 8—21)

ABSTRACT OF THE DISCLOSURE

This disclosure relates to polyester-containing shaped articles, e.g., fibers, dyed with 1-(2-methoxy-4-nitrobenzeneazo)-2-hydroxy-11H-benzo(a)carbazole-3-carbox - p-anisidide.

---

It is known to dye polyester shaped articles, such as Dacron fibers. It is also known to dye a fabric blend comprising an intimate mixture of polyester and cotton for providing press-free, crease-retaining garments.

Blue dispersed dyes which have been employed in the past to dye polyester-containing shaped articles have not been entirely suitable. For instance, the dyed articles have had relatively poor fastness to light, washing, heat and sublimation. This is especially evident in the preparation of fabric for press-free, crease-retaining garments. During the required cure at elevated temperatures, the known blue dispersed dyes thereon undergo a shade change, a loss in light fastness or show excessive sublimation which is damaging to the equipment.

It has now been discoreved that a polyester shaped article, e.g., a polyester-cotton fabric blend, can be dyed with a naphthol-type compound to provide a blue-grey product having superior fastness to light, washing, heat and sublimation. Thus, in accordance with one embodiment of this invention, a polyester-containing shaped article is dyed with 1-(2-methoxy-4-nitrobenzeneazo)-2-hydroxy-11H-benzo(a)carbazole-3-carbox-p-anisidide. This compound has the following structure:

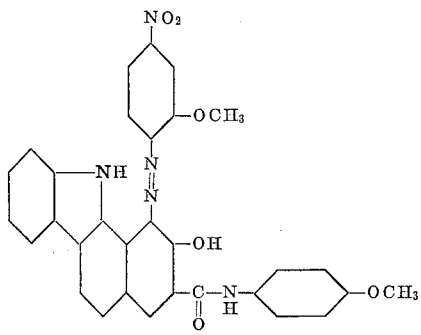

The naphthol-type dye compound employed herein may be prepared by a diazo coupling procedure, i.e., coupling 2-methoxy-4-nitroaniline with 2-hydroxy-11H-benzo(a)-carbazole-3-carbox-p-anisidide. The diazo coupling procedure is well known in the art.

Synthetic fibers and other shaped articles are formed from polyesters which are well known in the art (U.S. Pat. Nos. 2,465,319, 2,901,466, 3,341,277, which are incorporated herein by reference). As stated in Encyclopedia of Chemical Technology, vol. 13, pp. 840–6 (1954), which is also incorporated herein by reference, polyester fibers are made from high polymers that are condensation products of alcohols and organic acids or of hydroxy acids. This includes, among others, the condensation products of polybasic acid or esters thereof with polybasic alcohols, e.g., polyethylene terephthalate (Dacron), and products of p,p'-sulfonyldibenzoic acid or terephthalic acid with 1,4-cyclohexanedimethanols.

In the present invention, the polyesters can be used alone. However, a composite shaped article, e.g., fabric, can be also formed by mixing polyesters with one or more natural or synthetic materials. This includes, among others, the following polyolefins, such as polypropylene and polyethylene; polyamides, such as nylon; polymers of acrylic acid compounds, such as acrylonitrile; polymers of vinyl compounds, such as vinyl alcohol, vinyl chloride and styrene; polyacetals, such as polyformaldehyde, and cellulose triacetate; cotton; wool; silk and mixtures thereof. The range of the polyesters in the shaped articles is generally about 20% to about 100%, e.g., 25% to 65%. Preferred composite fabrics are blends of polyester-cotton, polyester-rayon and polyester-cotton-rayon.

Synthetic shaped articles are formed from the aforementioned polyesters in accordance with known prior art procedures. A fiber is defined herein as any fibrous unit, for instance, filament yarns, mats, staple yarns, rovings, sheets, rods, plates, woven fabrics and chopped fibers.

The naphthol-type compound heretofore described forms the basis of an aqueous dye bath into which the fibers are immersed. Since the dyes are insoluble in water, they must be dispersed in the bath. Any known dyeing techniques may be employed in this invention to provide a dyed fiber, including, among others, the methods discussed and referenced in the article by Fortess, Advances in Textile Processing, vol. 1, pages 333–373. A suitable method for dyeing a polyester-cotton fabric for preparing press-free, crease-retaining garments (U.S. Pat. Nos. 2,974,432 and 3,268,915 which are incorporated herein by reference) is to pass the fabric through an aqueous dispersion of the aforementioned naphthol-type dye and to squeeze the fabric between closely set rollers to remove excess dye liquor. The dye, which is only loosely attached to the fabric, is subsequently fixed thereon by subjecting it to a short, intensive heat treatment at elevated temperatures, e.g., 120° to 220° C. The dyed fabric therefrom is padded with an aqueous solution containing a polymerizable resin and a catalyst with other optional ingredients, such as a softener, a hand modifier, a water repellent, a gum, a wetting solution and the like and it is then dried at a temperature below the polymerization temperature of the resin. After the dried, treated fabric is cut, sewed, finished and pressed, the resulting garment is placed in an oven at elevated temperatures to cure the resin.

Any suitable water-soluble polymerizable resin, e.g., a thermosetting resin, can be employed to form the aforementioned press-free, crease-retaining garments. This includes, among others, the urea-forbmaldehyde resins, melamine-formaldehyde resins and urea-formaldehyde-glyoxal resin disclosed in U.S. Pat. Nos. 2,974,432, 3,049,-446 and 3,268,915 which are incorporated herein by reference. Any suitable catalyst required for curing the resin can also be employed.

Thus, in accordance with the present invention, a blue-grey dyed polyester shaped article has been provided. This article dyed with 1-(2-methoxy-4-nitrobenzeneazo)-2-hydroxy-11H-benzo(a)carbazole-3-carbox-p-anisidide has excellent fastness to light, washing, heat and sublimation.

The following example is submitted to illustrate but not to limit this invention. Unless otherwise indicated, all parts and percentages in the specification and claims are based upon weight.

EXAMPLE I

An aqueous dye paste was formed by mixing 10 grams 1 - (2-methoxy-4-nitrobenzeneazo)-2-hydroxy-11H-benzo-(a)carbazole-3-carbox-p-anisidide, 1 gram Marasperse N (sodium ligno sulfate) and 56 grams water. A fabric sample of an intimate blend of 50% Dacron (polyethylene terephthalate) and 50% cotton was impregnated by passing it open width through a bath containing 10 grams of the dye paste, 7.5 grams sodium alginate and 1000 grams water and by squeezing subsequently between two pad rolls under sufficient pressure to obtain a 50-55% weight increase of the wet fabric. After drying in a hot air oven at 70° C., the fabric was heated in a hot air oven at 200-210° C. for 1-2 minutes to provide a uniformly fixed dye product.

This dyed fabric was then subjected to a reductive steaming operation by passing it through a solution containing 45 grams/l. caustic soda flakes and 30 grams/l. sodium hydrosulfite. This was followed by steaming for 30-45 seconds at 100°-110° C., a cold water rinse and an oxidation treatment consisting of 6 grams/l. sodium bichromate and 7.5 grams/l. glacial acetic acid. A thorough wash was given to remove residual chemicals from the oxidative step.

One portion of the dyed produce was subjected directly to the test described hereafter.

The other portion of this dyed product was treated by passing it through a solution containing ½ gallon water, 32 ozs. urea-formaldehyde-glyoxal resin (Permafresh 183), 5.76 ozs. zinc nitrate solution as a catalyst, 3.88 ozs. nonionic polyethylene emulsion (Mykon SF) as a softener, 5.12 ozs. nonionic polymer emulsion (Silkhand 40) as a hand modifier, 5.9 ozs. acrylic polymer (Rhoplex HA 12) as a builder and 0.32 oz. alkylaryl polyether alcohol (Triton X-100) as a nonionic surfactant. The treated, dyed product was then squeezed between two pad rolls, dried in a hot air oven at 60° C. and cured at 170° C. for 15 minutes to provide a press-free, crease-resistant dyed fabric.

The sample portion of dyed products without subsequent resin treatment and the sample portion of dyed products with subsequent resin treatment were subjected to the following tests:

(1) Color fastness for washing (synthetics):
Tentative test method 61-1961 T (1960 technical manual of the American Association of Textile Chemists and Colorists, page 105) with Test III-A being used for polyester.
(2) Color fastness to light:
AATCC Standard Tet Method 16-A, 1960 (page 90 loc. cit.).
(3) Sublimation and heat fastness tests:
Sublimation and heat fastness test were run at 265° F. for 15 minutes.

Both blue-grey dye sample portions had substantially no fading about exposure for 40 hours in the fadometer. Both sample portions also had excellent fastness to light, washing and sublimation.

Having set forth the general nature and specific embodiments of the present invention, the scope is now particularly pointed out in the appended claims.

What is claimed is:

1. A blue-grey dyed shaped article having excellent fastness properties which comprises a polyester shaped article dyed with 1-(2-methoxy-4-nitrobenzeneazo)-2-hydroxy-11H-benzo(a)carbazole-3-carbox-p-anisidide having the following structure:

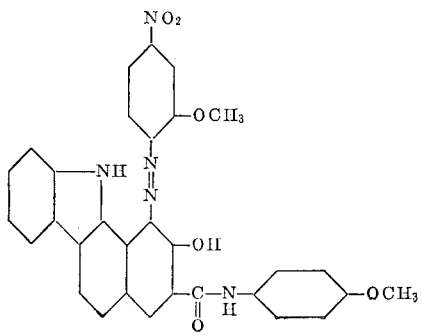

2. The article according to claim 1 in which the shaped article is a polyester fiber.

3. The article according to claim 1 in which the shaped article is a composite fabric comprising a polyester fiber and a fiber which is selected from the group consisting of a natural fiber and a synthetic fiber.

4. The article according to claim 1 in which the shaped article is a composite fabric comprising polyester and cotton.

5. A press-free, crease-retaining garment fabric having a blue-grey shade and having excellent fastness properties which comprises a composite fabric comprising polyester and cotton dyed with 1-(2-methoxy-4-nitrobenzeneazo)-2-hydroxy - 11H - benzo(a) carbazole-3-carbox-p-anisidide having the following structure:

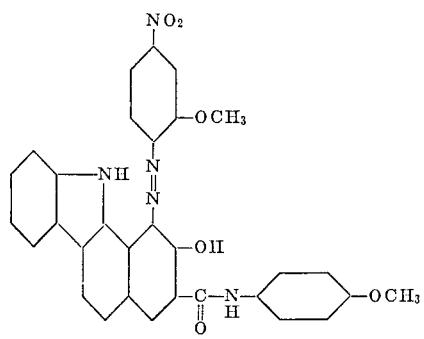

6. A process for providing a blue-grey dyed shaped article having excellent fastness properties which comprises dyeing a polyester shaped article with 1-(2-methoxy-4-nitrobenzeneazo)-2-hydroxy-11H - benzo(a) carbazole-3-carbox-p-anisidide having the following structure:

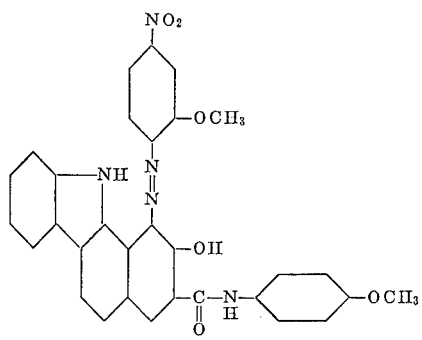

7. The process according to claim 6 in which the shaped article is a polyester fiber.

8. The process according to claim 6 in which the shaped article is a composite fabric comprising a polyester fiber and a fiber which is selected from the group consisting of a natural fiber and a synthetic fiber.

9. The process according to claim 6 in which the shaped article is a composite fabric comprising polyester and cotton.

References Cited

UNITED STATES PATENTS 3,123,433 3/1964 du Peloux et al.
3,164,438 1/1965 Thomas _____ 8—46

FOREIGN PATENTS 809,221 2/1959 Great Britain.

NORMAN G. TORCHIN, *Primary Examiner.*

D. LEVY, *Assistant Examiner.*

U.S. Cl. X.R.

8—41, 18, 17